June 16, 1936. H. B. COOKE 2,044,421
REMOVING GUM FORMING CONSTITUENTS FROM FUEL GAS
Filed Sept. 29, 1933
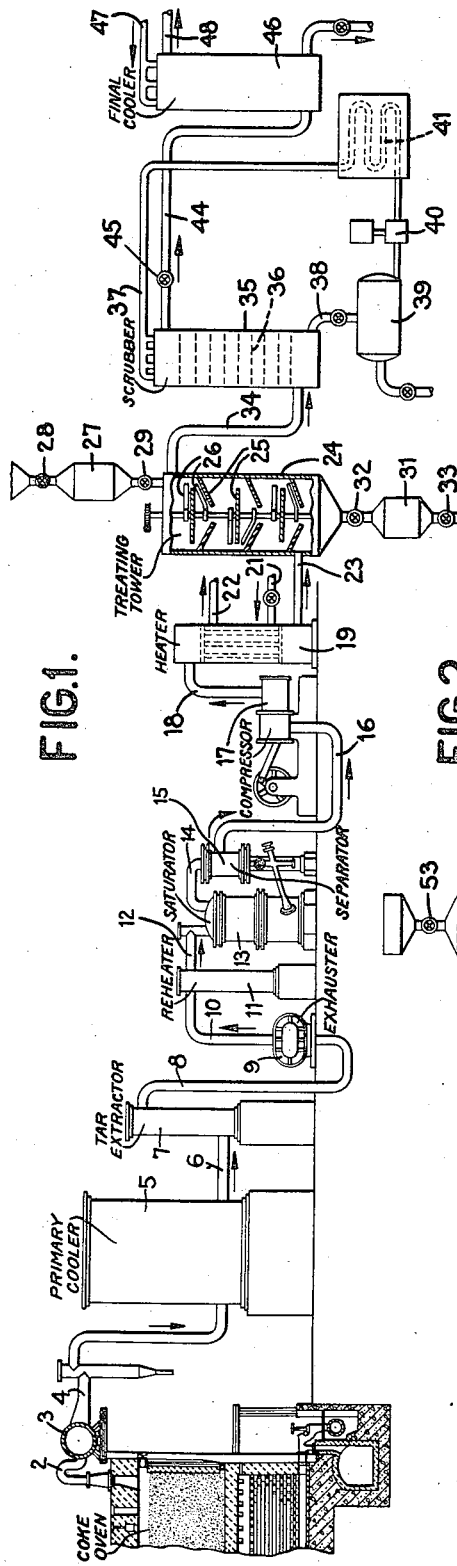
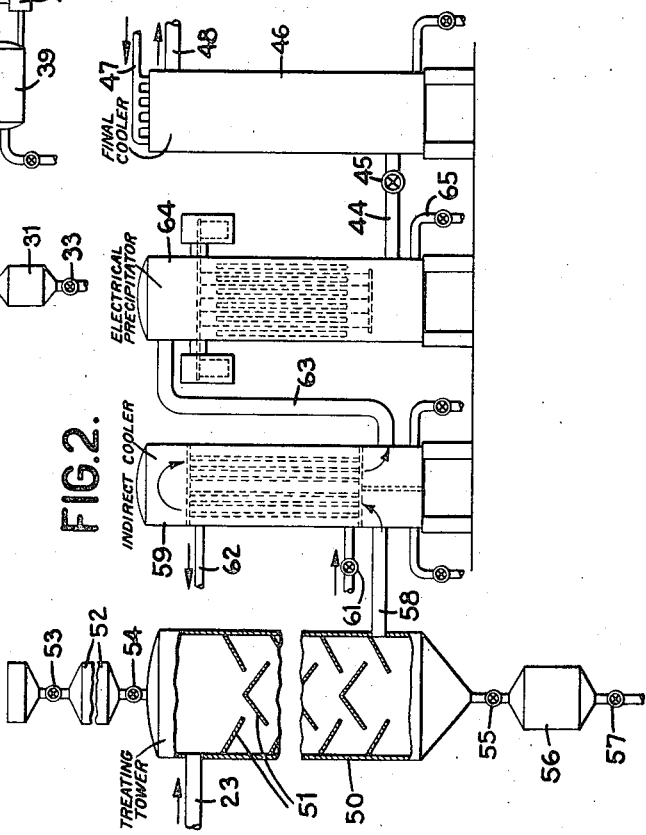
INVENTOR
HORACE B. COOKE
BY Donald H. Mace
ATTORNEY Patented June 16, 1936

2,044,421

UNITED STATES PATENT OFFICE 2,044,421

REMOVING GUM-FORMING CONSTITUENTS FROM FUEL GAS

Horace B. Cooke, Greenwich, Conn., assignor to The Gray Processes Corporation, Newark, N. J., a corporation of Delaware Application September 29, 1933, Serial No. 691,426

1 Claim. (Cl. 23—3)

My invention relates to the treatment of fuel gases, such, for example, as coke oven gas, carburetted water gas and other artificial or manufactured fuel gases, and more particularly to the removal therefrom of so-called gum-forming constituents.

It is known that artificial fuel gases of the character referred to hereinabove contain small amounts of constituents capable of polymerizing, with or without chemical reaction with other constituents, to form gummy or varnish-like substances which, although formed in exceedingly small amounts, cause considerable trouble in gas distribution systems through stoppage of pilot valves and other consumer apparatus having small orifices.

While the exact causes and conditions affecting the deposition of gums from fuel gases are not entirely understood, it is believed that polymerization plays a considerable part in the formation of these materials from potential gum-forming constituents present in the gas in initially harmless form, and it is known, as would be expected, that gum troubles are magnified in systems in which the fuel gases are subjected to a relatively high compression in order to transmit the fuel gas through pipe lines for considerable distances.

My invention has for an object the provision of an improved process for removing gum-forming constituents from fuel gases.

My invention has for a second object the provision of a process for removing gum-forming constituents from fuel gases in which the gases may be effectively treated with a minimum of obstruction to the flow of the gases and in advantageous relation to other operations incident to the manufacture and distribution of the gases.

My invention has for further objects such additional improvements in operative advantages and results as may hereinafter be found to obtain.

My invention contemplates subjecting fuel gases containing gum-forming or potentially gum-forming constituents to contact with fuller's earth, kieselguhr, infusorial earth, bentonite, acid-treated clay or other adsorbent clay having the property of promoting, by catalytic action or otherwise, the polymerization of relatively unstable constituents such as unsaturated hydrocarbons. Such contact may be effected in numerous ways as, for example, by passing the gas through a bed of the solid adsorbent material, but it is preferably effected according to my invention by passing the gas over extended surfaces or layers of the adsorbent material, which surfaces or layers are preferably agitated or raked to expose the material to the gas in the most efficient manner.

As an alternative mode of procedure, the adsorbent material in dry and finely divided form may be fed into the stream of gases and maintained in contact therewith for a period of time sufficient to effect the desired polymerization.

My invention further contemplates the subsequent treatment of the gases for the removal of the polymers to be formed, for example, by scrubbing the gases with a suitable adsorbent oil, or by means of electric precipitation, or by a combination of these methods.

The treatment of the gases is preferably carried out under somewhat elevated temperature and pressure and preferably at the point in the system where the gases have been freed from tar and other impurities and are as dry as possible. Thus my invention contemplates a system in which coal gas, after preliminary cooling, removal of tar and passage through sulphuric acid for the removal of ammonia, is compressed to whatever pressure is desired for the treatment or for transmission of the gas to the point of use, and then, with or without further heating, as may be desired, is contacted with solid adsorbent material of the character indicated, is then treated for the removal of the polymers formed, and is finally cooled prior to transmission or distribution.

In order that my invention may be clearly set forth and understood, I now describe, with reference to the accompanying drawing, various preferred forms and manners in which my invention may be practiced and embodied but without limiting my invention in its broadest aspects to such illustrative examples.

In this drawing,

Fig. 1 is a more or less diagrammatic elevational view of a plant for producing and treating coal gas in accordance with my present invention; and Fig. 2 is a similar view of an alternative form of a portion of the apparatus illustrated in Fig. 1.

Similar references designate similar parts in both of the views of the drawing.

Referring now to the drawing, and more particularly Fig. 1 thereof, there is shown, as the source of the gas to be treated, a coke oven which would normally comprise one of a battery of such ovens adapted for the carbonization of coal or the like. The gas liberated during the coking of the charge within the coke oven passes through a stand pipe 2 into the usual collecting main 3 and thence through a suction main 4 into a primary cooler 5. The primary cooler 5 may be of the indirect type as shown or may be of the direct type, but, in any event, the purpose of the same is to cool the gases in order to facilitate subsequent removal of the tar.

The cooled gases leaving the primary cooler 5 then pass through a main 6 to a tar extractor 7 which may be of conventional type. The more or less completely tar-free gases then pass through a main 8 to an exhauster 9, which may serve as a further means for removing tar.

From the exhauster 9 the gas is passed through a main 10 to a reheater 11 where the temperature of the gas is regulated as required for the subsequent ammonia-removal operation and then through a main 12 to a saturator 13. In the saturator 13 the gas is caused to bubble through a bath of sulphuric acid; the ammonia present in the gas combines with the acid to form ammonium sulphate, which is permitted to crystallize out and which may be removed in the conventional manner. The ammonia-free gas then passes through a main 14 to a separator 15 wherein separation of entrained acid is effected.

It will be obvious to those skilled in the art that the foregoing sequence of operations, while more or less conventional, may be subject to considerable modification without departing from the spirit of my present invention.

According to this aspect of my present invention, the gases leaving the saturator 13 and separator 15, in a relatively dry condition and at a temperature somewhat above atmospheric, are then passed through a main 16 to a compressor 17 wherein the gases are raised to a superatmospheric pressure of, for example, 20 pounds per square inch gauge or more or whatever pressure is required for the subsequent distribution and transmission of the gases. As the gases are compressed the temperature rises, and it is preferred not to dissipate this heat in the usual after-coolers but to maintain the gases at an elevated temperature up to and during the subsequent treatment with adsorbent material.

In the instance shown, the compressed gases leaving the compressor 17 pass through a main 18 to a heater 19 which may be of various types but is shown as of the tubular type having an inlet 21 and an outlet 22 for a suitable heating fluid. It will be understood that the gases may or may not be heated in the heater 19 according to the temperature of the gases leaving the compressor 17 and the temperature desired in the subsequent treating stage.

The actual temperature and pressure under which the gases are maintained in this point will, of course, vary in each instance and will depend largely upon the degree of compression required and the pressure and temperature necessary to accomplish an efficient removal of the gum-forming constituents. Inasmuch as the nature and quantity of these constituents will vary from instance to instance it will be obvious to those skilled in the art that no specific figures will pertain generally, but in most instances it is preferred that the gas leaving the heater 19 is compressed to at least 10 pounds per square inch above atmospheric and has a temperature of 150° F. or more.

The warm compressed gas then passes through a main 23 into a treating tower 24 wherein it is brought into intimate contact with fuller's earth or other analogous solid adsorbent material of the character indicated hereinabove.

While various forms of treating apparatus may be employed, I prefer to employ a tower 24 provided with a plurality of trays or shelves 25 adapted to support layers of the solid adsorbent material and provided with rabble arms or scrapers 26 adapted to agitate the adsorbent material and to cause it to move from one tray or shelf to the next tray or shelf below and thus through the entire length of the treating tower 24.

In the embodiment shown in Fig. 1, fuller's earth or other similar adsorbent material is supplied to the upper portion of the treating tower 24 from a supply hopper 27 having inlet and outlet valves 28 and 29, respectively, and passes downwardly through the tower over the shelves or trays 25 impelled by the arms 26, countercurrent to the rising flow of gases. By means of the contact thus effected, gum-forming or potentially gum-forming constituents of the gas are caused to be polymerized. At least a considerable portion of the polymers thus formed may be removed from the bottom of the treating tower 24 along with the fuller's earth in the bottom of the tower 24, to pass into a receiving hopper 31 having inlet and outlet valves 32 and 33, respectively. The gases leaving the upper portion of the tower 24 may, however, and ordinarily will, contain polymers in suspension therein in very finely divided form and which must be removed from the gases prior to distribution thereof. For this purpose, in the embodiment of my invention illustrated in Figure 1, the gases leaving the treating tower 24 are passed through a main 34 to a scrubber 35 which is provided interiorly with suitable gas-and-liquid-contact apparatus such as hurdles or trays 36. As the gases pass through the scrubber 35, they are washed with a suitable adsorbent oil introduced into the upper portion of the scrubber 35 through a conduit 37, and polymers present in the gas are removed by the oil. The adsorbent oil reaching the bottom of the scrubber 35 passes through conduit 38 to a circulating tank 39 from which oil is returned to the scrubber 35 by means of a pump 40 into the conduit 37. Temperature regulating means 41 may be provided for cooling or heating the circulating oil as may be desired.

The oil employed in the scrubber 35 may comprise kerosene, gas oil or straw oil and is preferably recirculated at a relatively high rate and may be replenished in part or entirely from time to time, although the actual amount of polymers removed will in most instances be so small that the absorbent oil is capable of use for extended periods without refreshment.

The scrubbed gases then pass through a main 44 having a valve 45 therein, which may be used, if desired, for reducing the pressure of the gases, to a final cooler 46 wherein the gases are washed with cold water introduced through conduit 47 and are thus cooled to substantially atmospheric temperature. The cooled and treated gas then flows through a main 48 to the point of use or to the transmission main (not shown).

In the modification of my invention illustrated in Fig. 2, the gases leaving the heater 19 pass through conduit 23 into the upper part of a treating tower 50 provided with sloping baffles 51 and adapted to receive finely divided adsorbent material from a supply hopper 52 having valves 53 and 54. The finely divided material introduced from the hopper 52 at a rate regulated by the valve 54 passes downward over the baffles 51, the angle of inclination of which is made greater than the angle of repose of the adsorbent material so that the latter passes downward over the baffles 51 concurrently with respect to the downward flow of the gas. If desired, the baffles 51 may be omitted entirely and the finely divided adsorbent material may simply be fed into the downwardly moving stream of gases.

The adsorbent material reaching the bottom of the tower 50 is withdrawn therefrom through a valved outlet 55 into a receiving hopper 56 having an outlet valve 57, while the treated gases pass through a main 58 to an indirect cooler 59 of conventional type having conduits 61 and 62 for the admission and removal, respectively, of a suitable cooling fluid. The cooler 59 may be employed to cool the gases down to atmospheric temperature or to any other temperature desired or may be omitted entirely. In either event, the gases are passed through a main 63 to an electrical precipitator 64 shown as of conventional type and provided with a valved outlet 65 for removing polymers or other material precipitated from the gases.

The treated gases may then be passed through the conduit 44 to the final cooler 46 as in the modification shown in Fig. 1 and the purified gas passes out of the final cooler 46 through the main 48 as before. It will, of course, be understood that when the gases are cooled in the indirect cooler 59 to a temperature approximately atmospheric, the final cooler 46 may be dispensed with, but ordinarily I prefer to employ it as offering further insurance against the presence of harmful gum-forming constituents or gums in the treated gases.

As mentioned hereinabove, in place of the tower 24 or the tower 50 I may employ a treating tower in which the gases to be treated are passed through a relatively thick bed of fuller's earth or the like, but the apparatus shown in Figs. 1 and 2 is preferred by reason of the relatively low back pressure and relatively high efficiency thereof.

Regardless of the particular type of treating tower employed, however, the gases passing therethrough may be either simultaneously or previously cooled to such extent as to effect a partial condensation of normally liquid constituents thereof, or a mist or fog of oil may be introduced into the gas stream prior to or during the passage of the gas through the treating tower or prior to or during the passage of the gas through the electrical precipitator. In either event, the presence of the oil thus condensed or introduced assists in the removal of the products of polymerization. It will be understood that any of the various types of clay treating towers disclosed may be employed in conjunction with an oil scrubber or with an electrical precipitator. In any event, but especially where the gas is passed through a bed or beds of adsorbent clay or fuller's earth, the introduction of oil as a fog or otherwise, or partial condensation, or both, are useful in that the oil tends to keep the adsorbent clay free from polymers and therefore in a reactive condition.

If desired, I may introduce into the gas, either prior to or during or even subsequent to the treatment with adsorbent material, an oxidizing accelerator such as oxygen or an oxide of nitrogen. In any event, however, if the introduction of such accelerator is resorted to, this introduction should be effected at such a point that the effects thereof will be confined to the manufacturing plant and/or the gas transmission main and will not extend into the ultimate gas distribution system.

While I have indicated hereinabove the nature of adsorbent materials which I prefer to employ, and of these fuller's earth is the preferred material, it will be obvious that other materials, having the property of selectively polymerizing unstable unsaturated constituents of fuel gases, may be employed. The term "adsorbent clay" as employed in the claim hereinafter made, is intended to designate material having the property of promoting, catalytically or otherwise, the polymerization of unstable unsaturated hydrocarbons; the term includes fuller's earth, kieselguhr, infusorial earth, bentonite, acid-treated clays and other adsorbent materials having the property of effecting selective polymerization of unstable unsaturated constituents. Moreover, such materials may be employed in conjunction with additional catalytic agents such, for example, as copper oxide, whenever desired.

While I have described my invention hereinabove with respect to the treatment of coke-oven gas produced from coal, my invention may be applied to the treatment of other types of artificial fuel gases such, for example, as carburetted water gas and other gases containing constituents which polymerize to form gums.

It will therefore be obvious to those skilled in the art that my invention is not limited to the details of the illustrative examples set forth and described hereinabove but may variously be practiced and employed within the scope of the claim hereinafter made.

I claim:

The process of treating fuel gas derived from the gasification of carbonaceous fuel containing relatively minute quantities of potentially gum-forming constituents to prevent the deposition of gummy or resinous material from said gas upon distribution thereof, which comprises compressing the gas to a moderately elevated superatmospheric pressure, contacting the compressed gas while substantially at the temperature of compression with freely falling particles of finely divided solid adsorbent catalytic material to polymerize said gum-forming constituents, and then subjecting the gas to electrical precipitation to remove polymers entrained in the gas after contact with said catalytic material.

HORACE B. COOKE.